US012296616B2

(12) United States Patent
Alvarez

(10) Patent No.: US 12,296,616 B2
(45) Date of Patent: May 13, 2025

(54) PAINTING SYSTEMS AND PAINT DEVICES AND RELATED METHODS

(71) Applicant: Michael Alvarez, Fayetteville, GA (US)

(72) Inventor: Michael Alvarez, Fayetteville, GA (US)

( * ) Notice: Subject to any disclaimer, the term of this patent is extended or adjusted under 35 U.S.C. 154(b) by 533 days.

(21) Appl. No.: 17/650,628

(22) Filed: Feb. 10, 2022

(65) Prior Publication Data

US 2022/0258529 A1 Aug. 18, 2022

Related U.S. Application Data

(60) Provisional application No. 63/200,094, filed on Feb. 12, 2021.

(51) Int. Cl.

*B44D 3/12* (2006.01)
*A46B 17/02* (2006.01)
*A46B 17/06* (2006.01)

(52) U.S. Cl.

CPC .............. *B44D 3/128* (2013.01); *A46B 17/02* (2013.01); *A46B 17/06* (2013.01); *B44D 3/123* (2013.01); *A46B 2200/202* (2013.01); *B44D 3/126* (2013.01)

(58) Field of Classification Search

CPC .......... B44D 3/128; B44D 3/12; B44D 3/123; B44D 3/126; B44D 3/16; B44D 3/162; A46B 17/02; A46B 17/06; A46B 2200/202

USPC ....... 220/697, 698, 699, 700, 695, 736, 570; 15/236.03, 236.01

See application file for complete search history.

(56) References Cited

U.S. PATENT DOCUMENTS

| | | | | |
|---|---|---|---|---|
| 2,436,924 A * | 3/1948 | Hansen | B44D 3/10 | 210/474 |
| 5,297,695 A * | 3/1994 | Provence | B44D 3/123 | 220/23.83 |
| 5,924,593 A * | 7/1999 | Rutledge, Jr. | B44D 3/128 | 220/699 |
| 2014/0203031 A1* | 7/2014 | Eldridge | B44D 3/12 | 220/700 |
| 2021/0107313 A1* | 4/2021 | Casey | B44D 3/12 | |
| 2022/0258210 A1* | 8/2022 | Cardosa, II | B08B 1/165 | |

FOREIGN PATENT DOCUMENTS

NL 1023986 C2 * 11/2004 ......... B05C 17/0245

* cited by examiner

*Primary Examiner* — Robert J Hicks
(74) *Attorney, Agent, or Firm* — Law Office of Paul B. Johnson; Paul B. Johnson

(57) ABSTRACT

A painting system for removing excess paint from a paint applicator and reducing paint waste is disclosed. The painting system includes a paint device comprising a bar and a magnet assembly. The bar includes a first portion engaged with a second portion via a first bend, a third portion engaged with the second portion via a second bend, and opposing ends. The first portion and the first bend allow a user to press a paint applicator thereagainst to remove excess paint. The magnet assembly is configured to securely hold the paint applicator thereto via the paint applicator's metallic ferrule.

8 Claims, 7 Drawing Sheets

PAINTING SYSTEMS AND PAINT DEVICES AND RELATED METHODS

CROSS REFERENCE TO RELATED APPLICATIONS

This document claims the benefit of the filing date of U.S. Provisional Patent Application No. 63/200,094, entitled "Paint Devices and Related Methods," naming as first inventor Michael Alvarez, which was filed on Feb. 12, 2021, the disclosure of which is hereby incorporated entirely herein by reference.

BACKGROUND

1. Technical Field

The present invention relates generally to painting, paint applicators, paint containers, and other painting implements.

2. Background Art

Painting implements (brushes, paint buckets, painting tape, and the like) are well known in the art and are useful tools for holding paint, applying paint to a surface, preventing paint from being applied to certain surfaces, and so forth. FIG. 1 depicts a conventional painting system 101 including one or more paintbrushes 103, such as a straight cut paintbrush 103*a* and an angled paintbrush 103*b*, and a container 105 for holding paint 107 therein, the container 105 including a bucket 111 and a handle attached thereto. During use, a user dips the paintbrush 103 into the paint 107 and may wipe off excess paint using a lip or top inner edge 109 of the container 105. The user may then proceed to apply the remaining paint on the paintbrush 103 onto a surface.

The act of wiping excess paint from the paintbrush and onto the container has disadvantages. For example, excess paint builds up and solidifies around the lip. This not only wastes paint, but also hinders continuous action of wiping excess paint onto the lip. In addition, excess paint drips over the lip and onto the body of the container and surrounding surface area, necessitating cleanup that is often cumbersome. Moreover, the remaining paint on the paintbrush is dispersed unevenly, requiring the user to re-dip the paintbrush into the container more often. This can cause user fatigue and reduce the quality of the surface being painted.

Accordingly, it is an object of the present invention to provide painting systems and paint devices that addresses the disadvantages discussed above.

SUMMARY

Implementations of painting systems may include: a paint device comprising a bar, the bar comprising: a first portion, a second portion, a third portion, and opposing ends; wherein the first portion engages with the second portion via a first bend, the first bend positions the first portion relative to the second portion at a first angle, the second portion engages with the third portion via a second bend, the second bend positions the second portion relative to the third portion at a second angle which positions the first portion and the third portion substantially parallel to each other; and a coupling assembly configured to couple a paint applicator with the bar; and a container, the container having: a top edge; and a plurality of openings positioned below the top edge; wherein the paint device engages with the container via the plurality of openings.

Implementations of painting systems may include one or more or all of the following:

The coupling assembly may comprise a magnet assembly configured to couple the paint applicator with the bar using one or more magnets.

The magnet assembly may be configured to slide along the bar.

The magnet assembly may comprise one or more biasing elements configured to prevent the magnet assembly from sliding along the bar unless a user manually overcomes the bias.

The bar may comprise a substantially rectangular cross section.

The bar may comprise a substantially square cross-section.

At least one of the opposing ends may comprise a sharp end.

Each of the opposing ends may comprise a sharp end.

The first portion of the bar further may comprise a plurality of grooves configured to facilitate cleaning and straightening bristles of the paint applicator.

Implementations of paint devices may include: a bar comprising: a straight portion having a flat surface configured to facilitate removal of excess paint from a paint applicator when the paint applicator is slid thereagainst; and one of at least one sharp end configured to allow manual formation of an opening in a sidewall of a paint container; and a plurality of grooves in the flat surface configured to facilitate cleaning and straightening bristles of the paint applicator; and a coupling assembly configured to couple the paint applicator with the bar.

Implementations of paint devices may include one or more or all of the following:

The straight portion may be comprised in a first portion of the bar, wherein the bar further comprises a second portion, a third portion, and opposing ends including the at least one sharp end, and wherein the first portion engages with the second portion via a first bend, the first bend positions the first portion relative to the second portion at a first angle, the second portion engages with the third portion via a second bend, and the second bend positions the second portion relative to the third portion at a second angle which positions the first portion and the third portion substantially parallel to each other.

The coupling assembly may comprise a magnet assembly configured to couple the paint applicator with the bar using one or more magnets.

The magnet assembly may be configured to slide along the bar.

The magnet assembly may comprise one or more biasing elements configured to prevent the magnet assembly from sliding along the bar unless a user manually overcomes the bias.

The magnet assembly may comprise: a coupler configured to be biased when on the bar, the bias tending to prevent the coupler from sliding along the bar; a pair of openings configured to allow the bar to insert therethrough; a pair of wings configured to enable a user to overcome the bias to slide the magnet assembly along the bar; and a fastening mechanism configured to securely attach the one or more magnets to the coupler.

The bar may comprise the plurality of grooves.

The bar may comprise the at least one sharp end.

The first portion and the third portion may be offset from one another such that they are substantially not collinear.

Implementations of methods of use of a paint device may include: using a sharp end of a bar of a paint device, manually drilling a plurality of openings through a sidewall of a container; coupling the bar with the container by inserting opposite ends of the bar through the openings; and wiping a paint applicator on the bar to remove excess paint from the paint applicator.

Implementations of methods of use of a paint device may include one or more or all of the following:

The paint applicator may comprise one of a paint roller, a foam brush, a paintbrush, and a sponge.

The paint applicator may comprise a paintbrush, and the bar may further comprise a plurality of grooves configured to clean and straighten bristles of the paintbrush while wiping the paintbrush on the bar.

General details of the above-described implementations, and other implementations, are given below in the DESCRIPTION, the DRAWINGS, the CLAIMS and the ABSTRACT.

BRIEF DESCRIPTION OF THE DRAWINGS

Implementations will be discussed hereafter using reference to the included drawings, briefly described below, wherein like designations refer to like elements. The drawings are not necessarily drawn to scale.

Figure 1:
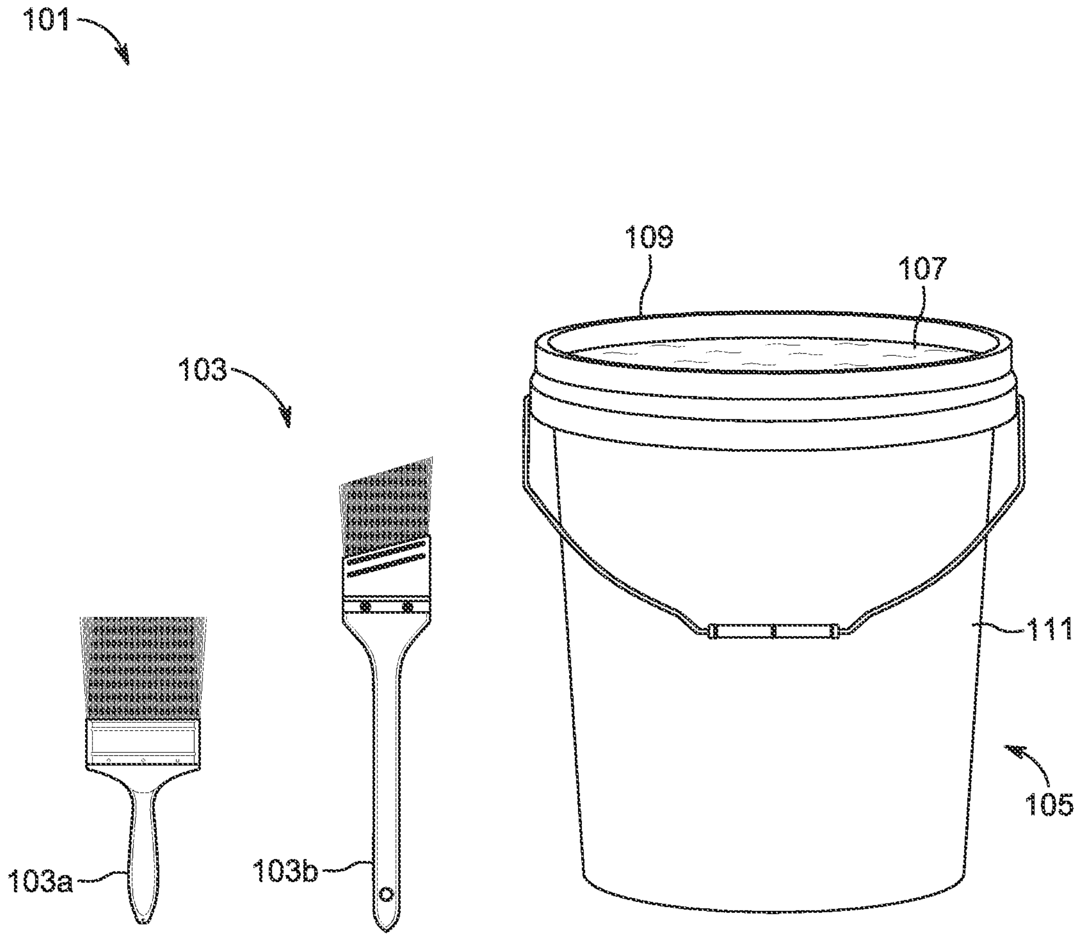
FIG. 1 PRIOR ART
FIG. 1 is a schematic representation of a prior art painting system.

While the painting systems and paint devices and related methods are susceptible to various modifications and alternative forms, specific embodiments thereof have been shown by way of example in the drawings and are herein described in detail. It should be understood, however, that the description herein of specific embodiments is not intended to limit the invention to the particular embodiments disclosed but, on the contrary, the intention is to cover all modifications, equivalents, and alternatives falling within the spirit and scope of the present application as defined by the appended claims.

DESCRIPTION

Implementations/embodiments disclosed herein (including those not expressly discussed in detail) are not limited to the particular components or procedures described herein. Additional or alternative components, assembly procedures, and/or methods of use consistent with the intended painting systems and paint devices and related methods may be utilized in any implementation. This may include any materials, components, sub-components, methods, sub-methods, steps, and so forth.

Illustrative embodiments of the painting systems and paint devices and related methods are provided below. It will of course be appreciated that in the development of any actual embodiment, numerous implementation-specific decisions will be made to achieve the developer's specific goals, such as compliance with system-related, device-related and/or business-related constraints, which will result in variations from one implementation to another. Moreover, it will be appreciated that such a development effort might be complex and time-consuming, but would nevertheless be a routine undertaking for those of ordinary skill in the art having the benefit of this disclosure.

The painting systems and paint devices and related methods in accordance with the present application overcome one or more of the above-discussed problems commonly associated with conventional painting systems. Specifically, the painting systems and paint devices and related methods of the present invention allow the removal of excess paint from a paintbrush efficiently and uniformly, thereby eliminating unnecessary cleanup as well as preventing user fatigue. These and other unique features of the painting systems and paint devices and related methods are discussed below and are illustrated in the accompanying drawings.

The painting systems and paint devices and related methods will be understood, both as to their structure and operation, from the accompanying drawings, taken in conjunction with the accompanying description. It should be understood that various components, parts, steps and features of the different disclosed embodiments of painting systems, paint devices and related methods may be combined together and/or interchanged with one another, each combination/variation being within the scope of the present application even though not all combinations/variations may be shown or depicted in the drawings. It should also be understood that the mixing and matching of features, elements, steps and/or functions between various embodiments is expressly contemplated herein so that one of ordinary skill in the art would appreciate from this disclosure that the features, elements, steps and/or functions of one embodiment may be incorporated into another embodiment as appropriate, unless described otherwise.

The embodiments herein described are not intended to be exhaustive or to limit the invention to the precise forms disclosed, but are chosen and described to explain the principles of the invention and its application and practical use to enable others skilled in the art to follow its teachings.

Figure 2:
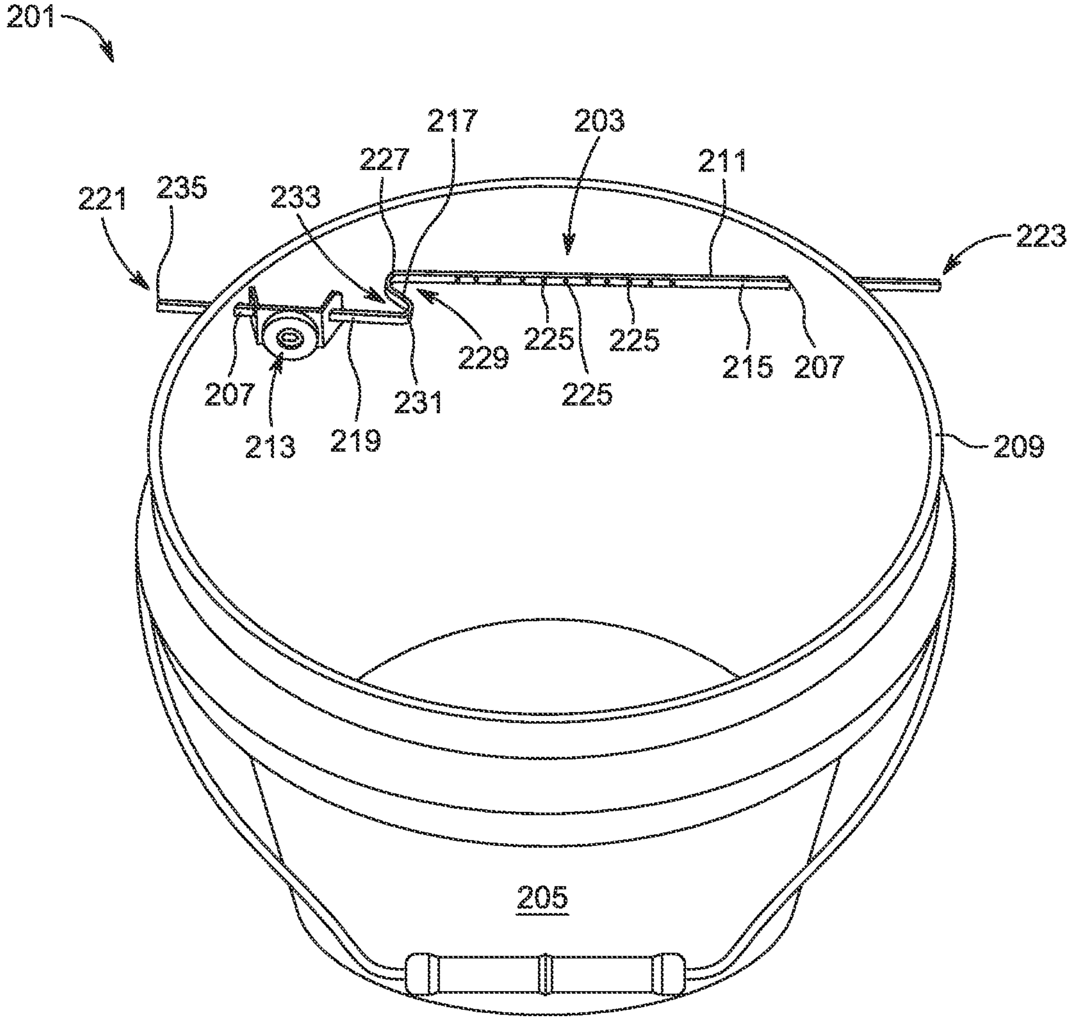
FIG. 2 is top perspective view of an implementation of a painting system.

Referring now to the drawings, wherein like reference characters identify corresponding or similar elements throughout the several views, FIG. 2 depicts a top perspective view of an implementation of a painting system (system) 201. It will be appreciated that the painting system 201 overcomes one or more of the above-listed problems commonly associated with conventional painting systems.

In implementations the painting system 201 includes a paint device 203 configured to be coupled through a plurality of openings 207 formed in a sidewall of a container 205. It should be appreciated that the plurality of openings 207 are positioned below the top edge or lip 209 of the container 205. In implementations the container could be a 5-gallon bucket or a bucket or container of any other size.

In implementations the paint device 203 includes a rectangular (or substantially rectangular) bar 211 and a magnet assembly 213 coupled with the bar. The magnet assembly 213 is shown in greater detail in FIG. 3 and is discussed further below.

The bar 211 includes a first portion 215, a second portion 217, a third portion 219, and opposing ends 221, 223. In implementations the bar 211 includes a rectangular (or substantially rectangular) cross-section. It should be appreciated that the rectangular nature of the bar 211 may help to prevent the bar 211 from rotating or otherwise displacing within the openings 207 when in an installed configuration (such as the configuration shown in FIG. 2). In addition, it should be appreciated that the bar 211 may include a square (or substantially square) cross-section, a non-rectangular cross-section, a triangular (or substantially triangular) cross-section, a cross-section having a shape of any n-sided polygon, an oval-shaped (or substantially oval-shaped) cross-section, and a cross-section having any other regular or irregular cross-section shape that helps to prevent or hinder the bar from rotating within the openings. Additionally, in implementations the bar could have a circular (or substantially circular) cross section that does not itself prevent rotation of the bar within the openings in the installed configuration, but one or more things other than the cross-section shape could prevent rotation of the bar within the openings—such as the offset nature of the first and third portions.

The first portion 215 includes a plurality of grooves 225 configured to facilitate cleaning and straightening of a paintbrush's bristles. In some embodiments, the plurality of grooves 225 may be excluded. The first portion can be seen in the drawings to comprise a straight portion having a flat surface (with the grooves therein) configured to facilitate removal of excess paint from the paintbrush when the paintbrush is slid thereagainst.

The first portion 215 engages with the second portion 217 via a first bend 227. The first bend 227 positions the first portion 215 relative to the second portion 217 at a first angle 229. It should be appreciated that the first angle 229 may include any angle size, such as 45 degrees or about 45 degrees, 90 degrees or about 90 degrees, or any other suitable angle between 45 degrees and 90 degrees (as used herein, "about" relative to any angle means within 5 degrees of that angle). During use, the user may press a paintbrush (not shown) against the first portion 215 and the first bend 227 in an upward motion to simultaneously remove excess paint from one face and one side of the paintbrush (the user being able to rotate the brush 180 degrees and repeat the motion to remove paint from the opposite face and side). In some implementations the user may press the paintbrush against the first portion 215 without pressing the paintbrush against the first bend if the user desires to only remove excess paint from the face(s) of the brush and not from the side(s) of the paintbrush.

The second portion 217 engages with the third portion 219 via a second bend 231. The second bend 231 positions the second portion 217 relative to the third portion 219 at a second angle 233, positioning the first portion 215 and third portion 219 parallel (or substantially parallel) to one another. It should be appreciated that the manner in which the first portion 215 and the third portion 219 are offset from one another so that they are not collinear, or so that they are substantially not collinear, helps to prevent the bar 211 from rotating within the plurality of openings 207 when in the installed configuration. In addition, it should be appreciated that the second angle 233 may include any angle size, such as 45 degrees or about 45 degrees, 90 degrees or about 90 degrees, or any other angle between 45 degrees and 90 degrees. Further, it should be appreciated that bends 227, 231 prevent paint present on the first portion 215 of the bar 211 from transferring to the third portion 219.

Although the bends shown in the drawing are represented as rounded bends, they could in implementations be sharp triangular bends, if desired, the inside corner of each bend terminating in a point instead of a rounded inner portion (and/or the outer portions terminating in points), though the rounded inner portion or inner diameter of the first bend may, in implementations, more evenly remove paint from a side of the paintbrush than a sharp inner angle would.

Figure 6A:
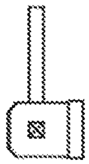
FIG. 6A is a front view of an implementation of a paint device.
Figure 6B:
FIG. 6B is a top view of the paint device of FIG. 6A.

In implementations end 221 comprises a sharp end 235. In other embodiments, end 223, or each end 221 and 223, comprises a sharp end 235. In other embodiments neither end comprises a sharp end. It should be appreciated that the sharp end 235 may include one or more angled edges (such as a single 45-degree or about 45-degree angled edge). In some implementations each sharp end comprises a pyramid shape, such as a four-sided pyramid, the pyramid terminating in a sharp apex or point which may be used to poke and/or indent a sidewall of a paint container, and a rotating motion of the bar may allow a drilling technique whereby the side edges of the pyramid remove material from the sidewall of the paint container until an opening is formed therethrough. Such a pyramid-shaped sharp end may be seen on the paint device of FIGS. 6A and 6B. Other pyramid shapes could be used, such as a three-sided or five-sided pyramid, as examples. In other implementations the sharp end may simply be a sharp cone at an end of the bar which is sharp enough to poke straight through a sidewall of a paint container with or without requiring a drilling motion. Other configurations are possible for the sharp end.

During use, the end 221 may be employed to manually drill (through a manual rotation) and/or punch into the container 205 to create the plurality of openings 207. In some embodiments, the plurality of openings 207 are integrally formed with the container 205 when it is fabricated so that no punching or drilling is required.

It should be appreciated that the bar 211 may be made from any rigid material such as steel, aluminum, other metals or metal alloys, any rigid non-metal material, any rigid composite material, any rigid polymeric materials, a rigid wood, or any combination of materials—though in implementations wherein the sharp ends are used to create the openings 207, the sharp ends should be durable and rigid enough to be able to be used to manually create the openings and the rest of the bar should be strong enough to not break or undergo plastic deformation during this process. In implementations the bar 211 is formed from corrosion-resistant materials, such as stainless steel.

In addition, it should be appreciated that the painting system 201 may vary based on aesthetic, functional, or manufacturing considerations. For example, in some embodiments, the paint device 203 may include one or more sliding couplers (not shown) configured to engage the paint device 203 with a top edge or lip 209 of the container 205. This configuration may allow the user to remove the paint device 203 from the container 205 more readily, though if the slider is not able to grip the lip 209 or otherwise secure thereto the user may not be able to make upward motions with the brush against the bar without lifting the bar off the lip—thus some securing mechanism may be used in such configurations, or the paint device may be weighted to keep it down, or the user may wipe the brush against the bar using an angled motion or horizontal motion instead of a vertical motion to prevent lifting of the bar. Whether the paint device is coupled to the paint container using the openings 207 or through some element to couple with the lip 209, the sharp ends and/or other elements used to couple the bar with the container may be called "coupling mechanisms." Coupling mechanisms other than those described herein are possible, as will be understood by the practitioner of ordinary skill in the art, and those disclosed herein are only examples. In another example, the paint device 203 may be installed in the reverse configuration of what is shown in FIG. 2 such that right-handed and left-handed users may use the paint device 203 according to their preferences.

In implementations the rectangular shape of the bar (or any other shape which includes a flat side) provides a straight, flat area for removing excess paint from a paintbrush efficiently and uniformly, thereby reducing waste and eliminating unnecessary cleanup.

Figure 3:
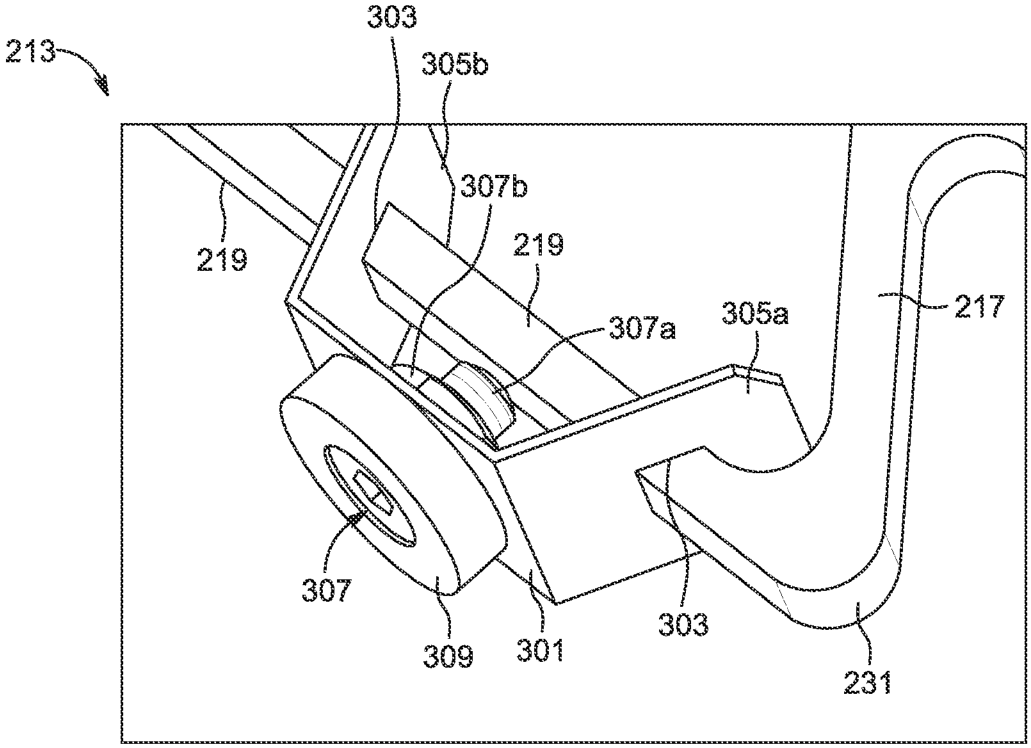
FIG. 3 is a closeup top perspective view of a magnet assembly of the painting system of FIG. 2.

Referring now to FIG. 3, a closeup view of the magnet assembly 213 is illustrated. The magnet assembly 213 is configured to removably couple a paintbrush (not shown, see FIG. 4) thereto.

As shown, the magnet assembly 213 includes a coupler 301 having a pair of openings 303 to allow the third portion 219 to insert therethrough. The coupler 301 is configured to be biased such that it resists sliding along the third portion when in the installed configuration (FIG. 3 shows the installed configuration). This bias prevents undesired moving of the magnet assembly. The coupler 301 also includes a pair of wings 305*a*, 305*b* (collectively referred to as 305) to enable the user to slide the magnet assembly 213 on, off or along the third portion 219 by manually squeezing the wings 305 toward one another to overcome the bias. The wings and openings 303 may be termed "biasing elements" inasmuch as they are configured to provide a bias to prevent sliding of the magnet assembly relative to the bar, the bias able to be overcome through manual force.

The coupler 301 further includes an opening (not shown) to allow a fastening mechanism 307, such as a screw 307*a* and nut 307*b*, to securely attach a magnet 309 thereto. It should be appreciated that the fastening mechanism 307 may include any other fasteners suitable to securely attach the magnet 309 to the coupler 301 such as bolts, studs, rivets, nails, pins, retaining rings, washers, and the like.

Figure 4:
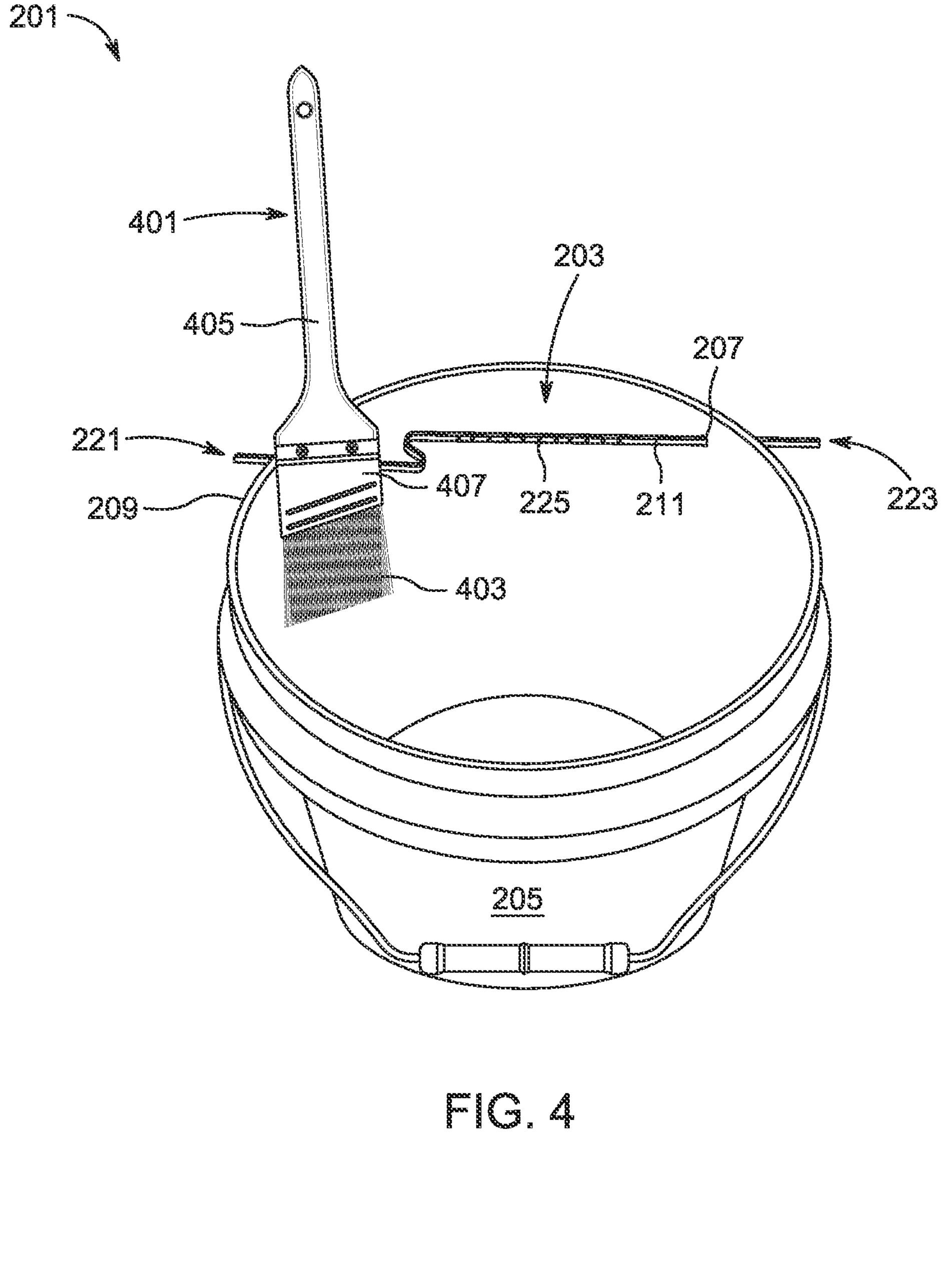
FIG. 4 is a top perspective view of the painting system of FIG. 2 with a paintbrush coupled to the magnet assembly.

In FIG. 4, a top perspective view of the painting system 201 is shown, illustrating a paintbrush 401 magnetically held by the magnet assembly 213 (and covering the magnet assembly so that the magnet assembly is not seen). As shown, the paintbrush 401 includes a plurality of bristles 403 coupled to a handle 405 via a metallic ferrule 407. The magnet assembly 213 magnetically holds the paintbrush via the metallic ferrule 407.

During use, the user may position the paintbrush 401 against the magnet assembly 213 in an upright position to allow paint to drip back into the container 205, thereby reducing paint waste. The magnet assembly 213 also provides a location to leave the paintbrush 401 in a secure, supported manner while the paintbrush 401 is idle. Supporting the paintbrush in this way, where the bristles are not contacting any surface, prevents the bristles from accidentally becoming stuck to a surface by dried paint, and it also provides a useful idle position for the brush such that the user can easily retrieve the brush and resume painting at any point.

Figure 5:
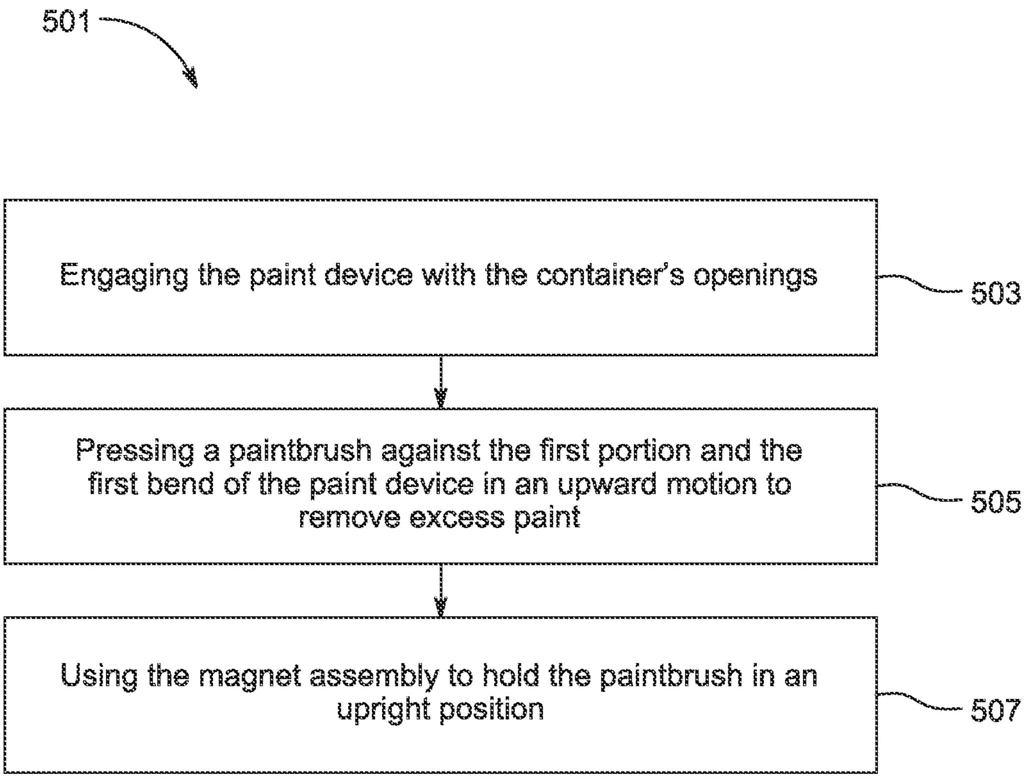
FIG. 5 is a flowchart of a method of use of the painting system of FIG. 2.

In FIG. 5 a flowchart 501 depicts a simplified method of use associated with system 101. During use, the user may engage the paint device with the container's openings, as shown with box 503 (for example by forming openings and placing the bar therethrough). The user may then press a paint-dipped paintbrush against the first portion and/or first bend of the paint device in an upward motion to remove excess paint from a face and/or side of the paintbrush, as shown with box 505 (the brush may be rotated 180 degrees and this step repeated to remove excess paint from the opposite face and/or side). The user may also use the magnet assembly to hold the paintbrush in an upright position, as shown with box 507.

Figure 7:
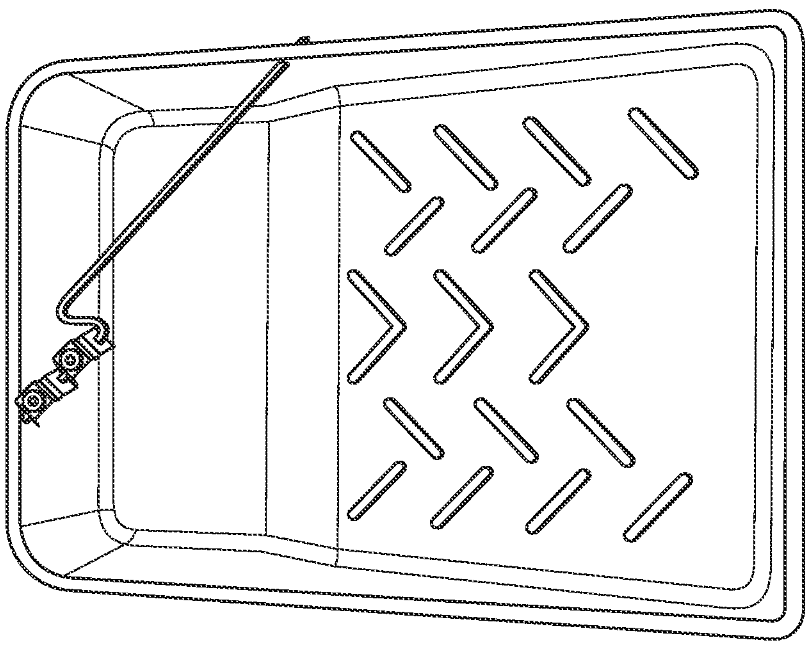
FIG. 7 is a top perspective view of an implementation of a painting system.
Figure 8:
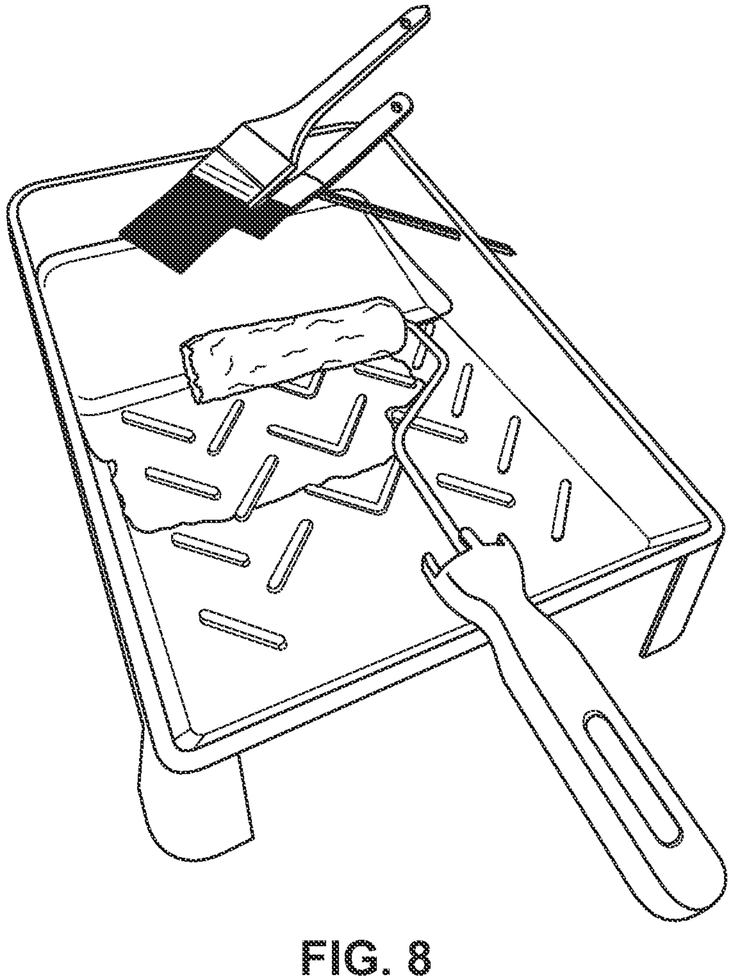
FIG. 8 is a front perspective view of the painting system of FIG. 7 in an environment of use with paint, paintbrushes, and a paint roller.

Although some of the drawings show the use of the paint device with a paint bucket, and with the paintbrush stored in an upright position, the paint devices may be used with other types of paint containers, such as a rectangular paint tray (commonly used to apply paint onto paint rollers). In such implementations the paint device may be installed in a similar way, by drilling/poking holes through adjacent sidewalls near a corner of the deep end of the paint tray as a non-limiting example (or using other coupling mechanisms disclosed herein), with the magnet assembly rotated 90 degrees so that the magnet faces upwards (this is shown with the magnet assemblies of FIGS. 6A and 6B). For example, this is the configuration with the painting system shown in FIGS. 7 and 8 which shows a paint device coupled with the tray (through openings in the tray) and with the magnet assemblies facing upwards. This allows one or more paintbrushes to be stored in a horizontal position as seen in FIG. 8 (as opposed to the upright position shown in FIG. 4), with the paintbrush bristles residing over the paint-containing portion of the paint tray. When used on a paint tray, the paint device may be installed using a left-handed configuration or right-handed configuration, by reversing the direction as desired, as described above with respect to a paint bucket. Paint trays and paint buckets are only examples, as well—the paint devices may be used with any type of paint container and the painting systems may include any type of paint container such as a bucket, a tray, or another container type. The paint device of FIGS. 7-8 is similar to those shown in previous drawings except having an additional magnet assembly, having the magnet assemblies facing upward, and with the first portion having a sharp end (which in FIGS. 7-8 can be seen to have a four-sided pyramid shape, though other shapes are possible as disclosed with other paint devices). The third portion could alternatively or additionally include a sharp end.

While only one magnet assembly is shown on the third portion in some of the figures, in implementations two or more magnet assemblies may be included on the third portion (as seen in FIGS. 6B-8). These could be slid farther apart to hold two paintbrushes (as in FIG. 8, for example the user could have one normal angle brush and one small fine-finish brush next to but not touching the angle brush) or the magnet assemblies could be slid closer together to hold one large paintbrush. When the magnet assemblies are slid closer together to hold one larger brush they may together provide a more secure attachment for a larger, heavier brush. Additionally, in implementations one or more magnet assemblies could be slid onto the first portion, if desired. The first portion and/or third portion may be of any desirable length for use with any size of paint container and for other reasons—for example they may be made longer in implementations wherein more magnet assemblies are desired to be placed thereon. The magnet assemblies are configured to not only slide side to side along the bar, but they can also be removed, rotated 90 degrees (or some multiple of 90 degrees) and slid back onto the bar to rotate the angle of the magnets. This allows paintbrushes to be stored in a vertical or horizontal idle position (as desired by the user and as shown in the drawings and described above). This functionality/capability can be envisioned by reviewing FIG. 3, as the openings 303 have (or have substantially) rectangular or square shapes which prevent rotation about an axis of the bar (or the third portion thereof) when in the installed configuration. The magnet assembly can thus be slid off the third portion, rotated in a 90-degree increment, and slid back on the third portion (or bar) to change its angle to allow horizontal or vertical idle positions for the paint applicators, as desired.

The painting systems and paint devices disclosed herein may be used to wipe excess paint off of paint rollers in addition to brushes. Referring to FIG. 8, a paint roller may be rolled in paint and then positioned so that a longest length of the roller portion is substantially perpendicular to a longest length of the first portion, and the roller may then be wiped against the first portion in an upwards motion to wipe excess paint off of a portion of the roller. The roller may be rotated a bit along its axis so that another portion of the roller faces the first portion and the wiping process may be repeated, these steps being repeated until the entire roller is wiped, to effectively remove as much excess paint as the user desires to remove. This may be done to remove excess paint from the roller prior to using the roller to paint a surface. The painting systems and paint devices disclosed herein are useful for removing excess paint from a wide variety of paint applicators including paintbrushes, paint rollers, sponges, foam brushes, and so forth, prior to using the paint applicators to paint surfaces. It is also the case that the painting systems and paint devices disclosed herein are useful to remove excess paint from paintbrushes, paint rollers, sponges, foam brushes, and so forth during a cleaning process to clean the paint applicators after the user is finished painting a surface (this may also help to preserve more paint for future use by returning unused paint to the tray or bucket or other container, where it may be stored or transferred to another container for storage). As used herein, the phrase "paint applicator" refers to paintbrushes, paint rollers, sponges, foam brushes, and other implements for applying paint to a surface, though any instance referring to a paint applicator having bristles refers to a paintbrush.

As used herein, the term "substantially parallel" means within 15 degrees of perfect parallelism. Any elements described herein as being parallel, or substantially parallel, may be exactly parallel, or within 15 degrees of being exactly parallel, or within 10 degrees of being exactly parallel, or within 5 degrees of being exactly parallel. As used herein, the term "substantially rectangular" means having no side more than 5 degrees offset from perfect rectangularity. As used herein, the term "substantially square" means having no side being more than 5 degrees offset from a 90-degree angle relative to neighboring sides and no side being more than 10% longer than neighboring sides. The phrase "substantially collinear" refers to two linear elements that come within 5 mm of one another and that are within 10 degrees of perfect parallelism. Correspondingly, the phrase "substantially not collinear" refers to two elements which either do not come within 5 mm of one another or do not come within 10 degrees of perfect parallelism. Any other use of "substantially" herein means a configuration that is not more than 10%, or 10 degrees, as the case may be, offset from a standard or perfect or given or stated configuration or standard, as will be understood by the practitioner of ordinary skill in the art based on what configuration/standard is being discussed.

In implementations any of the magnet assemblies described herein may be referred to as coupling assemblies inasmuch as they are configured to couple a paintbrush with the bar. In implementations a coupling assembly could exclude magnets but could otherwise be configured to hold the paintbrush in the positions shown in the drawings or in another upright position. For example, a gripping element could be used to grip the ferrule and/or handle of the brush, such as with a friction fit—or a hook or similar element could be used to hang the brush from a hole in the top of the handle in an upright position (this hole seen in the drawings, in FIG. 4 for instance). As used herein, an upright position refers to a position such as that shown in FIG. 4, with the handle of the brush pointing upwards and the bristles pointing downwards so that the bristles can effectively drain paint downwards away from the handle, while a horizontal position refers to a position such as that shown in FIG. 8 which is perpendicular or substantially perpendicular with the upright position.

It is pointed out that a circular bucket shape and lip are not ideal surfaces (due to their shape and/or flexibility) for wiping excess paint from a straight, flat paintbrush. Using them for wiping a brush has negative effects including uneven distribution of the paint on the paintbrush and excess paint being forced into the head of the paintbrush during the wiping motion, reducing the life of the paintbrush. It is also pointed out that, in implementations, because the first portion of the bar of the paint device is suspended with open space on either side, paint can be removed from both sides of the paintbrush without having to rotate the brush—the user using one side of the first portion to wipe one side of the paintbrush and the other side of the first portion to wipe the other side of the paintbrush. In such implementations the first portion may have grooves on both sides, or going all the way around the bar at the first portion, to help align and clean bristles when either side of the first portion is used.

The particular embodiments disclosed herein are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered to be within the scope and spirit of the application. Accordingly, the protection sought herein is as set forth in the description. Although specific embodiments are shown and described herein, painting systems and paint devices and related methods are not limited to just these embodiments, but are amenable to various changes and modifications without departing from the spirit thereof.

In places where the phrase "one of A and B" is used herein, including in the claims, wherein A and B are elements, the phrase shall have the meaning "A and/or B." This shall be extrapolated to as many elements as are recited in this manner, for example the phrase "one of A, B, and C" shall mean "A, B, and/or C," and so forth. To further clarify, the phrase "one of A, B, and C" would include implementations having: A only; B only; C only; A and B but not C; A and C but not B; B and C but not A; and A and B and C.

In places where the description above refers to specific implementations of painting systems and paint devices and related methods, one or more or many modifications may be made without departing from the spirit and scope thereof. Details of any specific implementation/embodiment described herein may, wherever possible, be applied to any other specific implementation/embodiment described herein. The appended claims are to encompass within their scope all such changes and modifications as are within the true spirit and scope of this disclosure.

Furthermore, in the claims, if a specific number of an element is intended, such will be explicitly recited, and in the absence of such explicit recitation no such limitation exists. For example, the claims may include phrases such as "at least one" and "one or more" to introduce claim elements. The use of such phrases should not be construed to imply that the introduction of any other claim element by an indefinite article such as "a" or "an" limits that claim to only one such element, and the same holds true for the use in the claims of definite articles.

Additionally, in places where a claim below uses the term "first" as applied to an element, this does not imply that the claim requires a second (or more) of that element—if the claim does not explicitly recite a "second" of that element, the claim does not require a "second" of that element. Furthermore, in some cases a claim may recite a "second" or "third" or "fourth" (or so on) of an element, and this does not necessarily imply that the claim requires a first (or so on) of that element—if the claim does not explicitly recite a "first" (or so on) of that element (or an element with the same name, such as "a widget" and "a second widget"), then the claim does not require a "first" (or so on) of that element.

Method steps disclosed anywhere herein, including in the claims, may be performed in any feasible/possible order. Recitation of method steps in any given order in the claims or elsewhere does not imply that the steps must be performed in that order—such claims and descriptions are intended to cover the steps performed in any order except any orders which are technically impossible or not feasible. However, in some implementations method steps may be performed in the order(s) in which the steps are presented herein, including any order(s) presented in the claims.

What is claimed is:

1. A paint device, comprising:

a bar comprising:

a straight portion having a flat surface configured to facilitate removal of excess paint from a paint applicator when the paint applicator is slid thereagainst; and one of at least one sharp end configured to allow manual formation of an opening in a sidewall of a paint container; and a plurality of grooves in the flat surface configured to facilitate cleaning and straightening bristles of the paint applicator; and a coupling assembly configured to couple the paint applicator with the bar.

2. The paint device of claim 1, wherein the straight portion is comprised in a first portion of the bar, wherein the bar further comprises a second portion, a third portion, and opposing ends including the at least one sharp end, and wherein the first portion engages with the second portion via a first bend, the first bend positions the first portion relative to the second portion at a first angle, the second portion engages with the third portion via a second bend, and the second bend positions the second portion relative to the third portion at a second angle which positions the first portion and the third portion substantially parallel to each other.

3. The paint device of claim 1, wherein the coupling assembly comprises a magnet assembly configured to couple the paint applicator with the bar using one or more magnets.

4. The paint device of claim 3, wherein the magnet assembly is configured to slide along the bar, and wherein the magnet assembly comprises one or more biasing elements configured to prevent the magnet assembly from sliding along the bar unless a user manually overcomes the bias.

5. The paint device of claim 4, wherein the magnet assembly comprises:

a coupler configured to be biased when on the bar, the bias tending to prevent the coupler from sliding along the bar;

a pair of openings configured to allow the bar to insert therethrough;

a pair of wings configured to enable a user to overcome the bias to slide the magnet assembly along the bar; and a fastening mechanism configured to securely attach the one or more magnets to the coupler.

6. The paint device of claim 1, wherein the bar comprises the plurality of grooves.

7. The paint device of claim 1, wherein the bar comprises the at least one sharp end.

8. The paint device of claim 1, wherein the first portion and third portion are offset from one another such that they are substantially not collinear.

* * * * *